United States Patent [19]

Miller et al.

[11] 4,025,476

[45] May 24, 1977

[54] TRAFFIC PAINT METHOD AND COMPOSITION

[75] Inventors: David R. Miller, Hughesville, Pa.; Jack D. Wolfe, deceased, late of Hughesville, Pa., by Edith B. Wolfe, executrix

[73] Assignee: Prismo Universal Corporation, Rockville, Md.

[22] Filed: Oct. 3, 1975

[21] Appl. No.: 619,355

[52] U.S. Cl. .................. 260/22 CQ; 260/28 R; 260/33.6 R; 260/33.6 UB; 260/33.8 R; 260/33.8 UB; 260/37 R; 260/402; 427/136; 427/137

[51] Int. Cl.$^2$ ............................................. C09D 3/66

[58] Field of Search ....... 260/998.19, 22 R, 22 CQ, 260/28; 427/136, 137

[56] References Cited

UNITED STATES PATENTS

| | | | |
|---|---|---|---|
| 2,812,337 | 1/1957 | Culemeyer | 260/97.5 |
| 3,030,870 | 4/1962 | Gill | 427/137 |
| 3,046,851 | 7/1962 | De Vries | 404/14 |
| 3,136,733 | 6/1964 | Ross et al. | 404/17 |
| 3,321,329 | 5/1967 | De Vries | 427/137 |
| 3,474,057 | 10/1969 | De Vries | 404/72 |
| 3,900,605 | 8/1975 | Norris | 427/137 |
| 3,928,266 | 12/1975 | Scohy et al. | 260/22 CB |

*Primary Examiner*—Ronald W. Griffin
*Attorney, Agent, or Firm*—Cushman, Darby & Cushman

[57] ABSTRACT

Ambient drying traffic paint compositions and methods for their application are disclosed comprising a resin binder and pigment(s) in a three-component or four-component solvent system, in parts by weight of:

solvent boiling point: 190–141° F.; 5–11
solvent boiling point: 140–106° F.; 12–17
solvent boiling point: 105–90° F.; 2–28
solvent boiling point greater than 225° F; 0–12

The disclosed compositions are applied at ambient temperatures without the use of external heating means and a relatively fast dry time of about 20 to 60 seconds is obtained.

16 Claims, No Drawings

TRAFFIC PAINT METHOD AND COMPOSITION

BACKGROUND OF THE INVENTION

The present invention relates to a method and composition for applying reflective markings on highways, roadways and the like in which the paint composition is applied at ambient temperature without the use of external heating means. A relatively fast dry time is obtained, generally of the order of about 20–60 seconds or less.

There are several procedures which have been used in the past for marking highways, their object being to apply a suitable marking material without the use of barriers, cones, traffic-deflecting means or the like such that the applied coating composition dries rather rapidly and preferably within a time period of one to two minutes or less. One such technique that has gained wide acceptance is described in U.S. Pat. No. 3,474,057. In that patent extremely fast dry times of road marking materials is achieved with the use of heat; that is, the paint composition is heated in a closed system to a temperature of 140°–250° F., then released from the closed system and sprayed onto the road surface in order to mark the road surface and permit the paint to dry quite rapidly, generally in less than about one minute or less.

While heating road marking paints and compositions, such as those mentioned above, has met with substantial commercial application, it is necessary to use rather elaborate equipment, which must be portable, and requires not only maintenance during operation but also the use of a separate heat source for raising the heat of the road marking composition carried by the equipment.

Other road marking compositions and procedures are described in U.S. Pat. Nos. 3,046,851, 3,136,733 and 3,321,329. While the paint compositions described in these patents are applied without the use of heat, the dry time required to obtain a suitable marking line which can be traversed by vehicles and road traffic is at least greater than one minute, and generally of the order of about three minutes or more. Such compositions usually require the use of road marking cones and the like to direct traffic away from the wet composition until a suitable non-tracking film has formed on the marked road surface.

Other prior procedures have used drop-on glass spheres, sand, particulate matter or the like in order to reduce the drying time of the applied paint composition. An example of this is a rounded sand such as crystal grade silica sand in a mixture ratio of one part glass spheres to two parts round sand. Using spheres or mineral matter in such a procedure, when applied to a wet film on the highway surface the close packing of the spheres which are subsequently applied provides a surface which is free from wet paint composition on the upper surface, yet it is rather immobile due to the solvent loss occurred in spraying. The glass-mineral surface is sufficient to support the tires of an automobile passing over the marked surface without touching the wet paint composition below the glass-mineral coating.

Other prior art procedures, including directing the projected paint spray through an open flame, are described in U.S. Pat. No. 3,321,329, or heating the surface of the road itself as described in U.S. Pat. No. 3,410,185.

DETAILED DESCRIPTION OF THE INVENTION

We have now discovered a group of paint composition which may be applied at ambient temperatures to a road surface without the use of heating the paint itself and/or the road surface, or the addition of drop-on or intermixed glass spheres to reduce the drying time, which composition after it is applied dries to a no-tracking condition in a period of about 20 to about 60 seconds generally of a thickness of between 0.018 and 0.015 mils measured in the wet condition.

The road marking compositions according to the present invention comprise the following essential ingredients, expressed in parts or percentage by weight:

| | |
|---|---|
| resin binder | 16–22 |
| pigment(s) | 47–48 |
| pigment volume concentration (PVC) | 46–59 |
| solvent system: | |
| boiling point 190–141° F. | 5–11 |
| boiling point 140–106° F. | 12–17 |
| boiling point 105–90° F. | 2–28 |
| boiling point greater than 225° F. | 0–12 |
| solids content (total non-volatile) | 67.5–75.5 |

Our invention also includes various methods for applying these novel compositions to a road surface to provide direction and color markings thereon.

Preferred formulations include, expressed in percentage:

| | | |
|---|---|---|
| resin binder | 18–22 | as alkyd resin, chlorinated rubber and chlorinated paraffin solids. |
| pigment(s) | 47–49 | as total pigment |
| solvent | 29.5–32.0 | ranging from 104° F. (40° C) to 293° F. (145° C) |
| total solids | 68.0–70.5 | |

The compositions of the present invention exhibit a degree of flexibility vastly improved over similar properties exhibited by prior road marking compositions. In fact, a majority of the paint compositions as exemplified herein are successfully tested for flexibility using procedures normally reserved for enamels.

As a further advantage of commercial significance, a majority of the compositions of the present invention as described herein are in compliance with current regulations in Los Angeles, California identified as Rule 66, relating to pollution of the surrounding atmosphere originating from expulsion of organic solvents. This standard requires that no more than 20 percent by volume of toluene ethylbenzene, branched chain ketones and trichloroethylene (8% by volume $C_8$ and higher aromatics except ethylbenzene) be expelled into the air. The compositions of the present invention, when the appropriate selection of components of the solvent system made, fully complies with this requirement. This means, as a practical matter, that these compositions may be used in compliance with most current local pollution requirements and without substantial concern for potential injury to the equipment operators applying such compositions.

Another advantage of the compositions of the present invention is that it may be shipped in interstate commerce without a "red label" or explosive warning-type label, for according to the testing that we have conducted these compositions, when the appropriate ingredients in the solvent system are selected, comply with the I.C.C. — D.O.T. closed cup system testing method at 100° F.

As used herein, the term ambient temperature refers to the temperature at which road marking compositions are normally applied in the United States and such temperatures are usually, and preferably, above the freezing point, such as about 35° F (1.5° C) up to as high as 90° F (32° C), or even higher. Such a range, however, is not a definitive range for we have been able to apply certain paint compositions according to the present invention at temperatures below the freezing point and have observed that cold weather, such as that usually present during the winter months, prevents skinning of the freshly applied paint composition. This permits more solvent to rapidly evaporate from the applied layer and thus decrease the dry time.

Drying times generally in the order of about 20 to about 60 seconds, or slightly greater, are achieved without the use of heating the paint composition as was the case using prior procedures. The prior procedures generally required heating of the order of about 100°-200° F, or more usually 150°-250° F.

Resins which are suitable as the resin binder or binders in the above formaulation include various commercially available resins such as phthalic alkyd resins of glycerol or another polyfunctional alcohol. Such oil-modified alkyd resins are prepared by heating an alkyd resin with a drying oil, such as an oil having an appreciable linoleic acid content, i.e., linseed oil, soybean oil and the like. These and other commercially available alkyd resins are described generally in the Encyclopedia of Polymer Science, Volume I, page 466. Particularly preferred are the short and medium oil length phthalic alkyd resins which have a polyol and phthalic content between 45 and 75 percent and an oil length of between 55 and 25 percent. The phthalic anhydride content is generally from about 30 –45 percent.

Alkyd resins suitable for use according to the present invention are the reaction product of a polyhydric alcohol, a poly basic acid and a fatty monobasic acid. Glycerol is the preferred polyhydric alcohol or polyol in forming the short and medium oil alkyds while the preferred polybasic acid is phthalic anhydride (ortho form) which together provide a combined polyol phthalic content of between 45 to 75% of the resin binder. Suitable oils which impart flexibility and drying to the alkyd are of the short or medium oil length and may be derived from soya, dehydrated castor oil, linseed oil, tall oil fatty acids and other oil sources and provide for 55 to 25% of the total of the resin binder. These and other alkyd resins are described in Technology of Paints, Varnishes and Lacquers, Martens (editor), Reinhold Book Corporation (1968) in chapter 4, the disclosure of which is hereby incorporated by reference. Suitable short and medium oil alkyds are available in commerce from several resin suppliers.

In addition to the resin binders mentioned above, it is also possible to admix such binders with other modifier resins such as chlorinated rubber, chlorinated paraffin and the like.

Film-forming chlorinated rubber products are well known and as such chlorinated rubbers useful in our compositions which include natural and synthetic rubbers containing from 50% to 70% chlorine by weight. As commercially obtainable, a specific material has a density of about 1.56-1.64 and a chlorine content of 64–67%. It is a granular whitish-yellow powder, amorphous and inelastic. A preferred material is the Parlon series of chlorinated isoprene rubbers commercially available from Herculese Incorporated, Wilmington, Delaware, and are available in a variety of viscosities ranging from 5 up to 300 cps. We prefer to use the less viscous materials as directed in the booklet "Properties And Uses Of Parlon Chlorinated Rubber", 1967 by Herculese Inc.

Solvents for chlorinated rubber are also well known and include aromatic hydrocarbons, e.g., benzene, toluene, xylene, styrene, ethylene dichloride, ethyl acetate, methyl ethyl ketone, methyl isobutyl ketone, propylene oxide. Diluents such as aliphatic hydrocarbons may also be used in the solvent systems of the present invention, e.g., petroleum ether, naphtha, mineral spirits (in minor amounts) and the like.

Chlorinated paraffins, when included in the resin base formulations of the compositions of the present invention provide a degree of flexibility to the resin binder, hence are useful for their plasticizing properties for the chlorinated rubber component and for their fire-retardant properties. Such materials are commercially supplied in the form of clear, medium viscosity liquids, light amber in color having a chlorine content of the order of about 40%, Chlorowax products commercially available from the Diamond Shamrock Chemical Company, Cleveland, Ohio, preferably Chlorowax 40, having the following properties, have been found to be a preferred class of materials:

| | |
|---|---|
| Color (Gardner Scale 1933) | |
| Viscosity Poises 25° C (Brookfield Viscometer) | 31 |
| Viscosity Index | 82.5 |
| Specific Gravity 25° C/25° C | 1.15 |
| Bulking Value (gallons per pound) | 0.104 |
| Pour Point (degrees C) | 0 |
| Heat Stability | 0.450 |
| Chlorine Content (percent) | 42 |
| Molecular Weight | 560 |

The oil-modified polyurethane resins useful in our compositions are generally described as the reaction products of a diisocyanate and a drying oil such as soya oil, tall oil (consisting primarily of oleic acid) and are described, inter alia, in U.S. Pat. No. 2,812,337 and the text Polyurethanes: Chemistry and Technology, Part II, Chapter 10 Interscience Publishers (1964), the disclosures of which are hereby incorporated by reference. The oil-modified polyurethane resin is generally compatible with the alkyd resin component and thus may be used as a partial or as a complete replacement for the alkyd resin as in Example 6.

The solvent system used in the novel compositions of our invention is a combination of low boiling and high boiling solvents. In overall the boiling points range from 90° F to 280° F and higher. In the preferred embodiments, as indicated in the above formulation, a majority of the solvent system consists of solvents having a boiling point within the range of 190°-141° F and 140°-106° F. Optionally, there may be included from two to twenty-eight percent of a solvent having a boiling point of 105°-90° F.

Suitable solvents include chlorinated hydrocarbons such as methylene chloride, 1,1,2-trichloroethane, chloroethane, trichloroethane, trichloroethylene (but not substantial amounts of chloroform), acetone, ethyl ether, petroleum ether, N-pentane, hexane, 5-hexane, isohexane, toluene, VM&P textile spirits, and hexsol-1. Because of the lack of a low flash point the preferred solvents are the chlorinated hydrocarbons, particularly methylene chloride.

We have found methylene chloride to be marginally compatible with chlorinated rubber when it is used in the resin binder system and thus we believe that, at least in part, the rapid ambient dry times that are obtained as described herein are due to and a function of the limited solubility of methylene chloride, a preferred solvent system component.

The paint compositions of an invention may include conventional paint additives such as dryers, dispersing agents, stabilizers, anti-setting agents, anti-skinning agents and similar materials.

Pigments, fillers and extenders used in the compositions of our invention are those normally associated with traffic marking coating materials and include aluminum silicate, magnesium silicate, calcium silicate, calcium carbonate, calcium sulfate, amorphous and/or crystalline silica, titanium dioxide, zinc oxide, lead chromate, and lead silica chromate. In addition to acting or contributing to the pigment effect some of the above-mentioned ingredients also serve as extenders or fillers for the composition. The amount of coloring agent/pigment needed varies with the type of pigment employed as well as the other ingredients in the composition, but it is usually a substantial portion, that is at least 40%, and preferably up to as much as about 50%.

Preferred pigments are titanium dioxide [both anatase and rutile] from 5 to 20%, and zinc oxide from 1 to 3%, for white marking paint while lead chromate, from 5 to 20%, is the preferred pigment for yellow marking paint. The stated ranges are variable according to the intended application and intended uses of the paint compositions.

According to the method aspect of the present invention, the paint compositions and formulations as described herein are mixed and maintained in a suitable state of agitation then deposited on to the road surface using a spray technique by either pumping the paint composition in a closed system or using auxilary air. The compositions are applied at ambient temperature, which is generally within the range of 35°–90° F. The thickness of the thus-applied paint composition is the same as conventional materials and is preferably within the range of 12 to about 20 mils. wet. The dry time is usually less than one minute and generally in a range of about 20 –60 seconds.

The paint compositions of the present invention are suitable for use in virtually all types of commercially available spray road marking equipment including spray guns, airless or atomized, both bleeder and non-bleeder types, with internal or external air mix. By virtue of the extremely short ambient temperature dry times exhibited by the compositions described herein they can be used in such spray equipment.

After compositions in accordance with the present invention are sprayed onto the road surface, glass beads or spheres can be immediately dropped onto the paint while it is still tacky so that the beads become partially embedded in the paint. The resulting line is immediately retroreflective. Usual commercial application equipment includes a spray head for the paint composition and associated therewith and positioned just behind the paint spray head is a glass bead dispensing device which is coordinated with the paint spray head to supply glass beads to the freshly applied undried paint line or marker passing under the glass bead dispenser.

Another embodiment of the present invention includes mixing the glass beads into the paint composition itself prior to application of the paint to the roadway surface. This is generally referred to as a "premix". We have observed that continued rapid dry times are achieved even when retroreflective glass spheres are included in paint. When included glass spheres are present preferably in an amount of about 1.3 pounds per gallon of finished paint, and even as high as 3 pounds per gallon of finished paint, or slightly higher, if required.

The compositions and methods of our invention are further illustrated in the following examples; unless otherwise indicated all parts and percentages are by weight.

EXAMPLE 1

A paint composition containing the following ingredients was prepared:

| Description | Percent |
| --- | --- |
| Methylene Chloride | 9.50 |
| 60% Medium Oil Glycerine Phthalic Alkyd | 5.85 |
| Chlorinated Rubber (20 cps) | 9.50 |
| Chlorinated Paraffin (40%) | 7.09 |
| Rutile Titanium Dioxide | 13.77 |
| Anatase Titanium Dioxide | 3.44 |
| Aluminum Silicate (Calcined Clay) | 18.94 |
| Magnesium Silicate | 12.05 |
| Anti-Skinning-Agent | 0.13 |
| Methylene Chloride | 19.49 |
| Epichlorohydrin | 0.21 |
| Prime Pigment Content | 17.21 |
| Solids Content | 68.30 |

This formulation exhibited a dry time of 25 seconds at 77° F (25° C) and a thickness of 0.018 mils wet.

EXAMPLE 2

A paint formulation containing the following ingredients was prepared:

| Description | Percent |
| --- | --- |
| Methylene Chloride | 9.55 |
| 60% Medium Oil Glycerine Phthalic Alkyd | 5.88 |
| Chlorinated Rubber (20 cps) | 9.55 |
| Chlorinated Paraffin (40%) | 7.13 |
| Montmorillonite Clay | .21 |
| Propylene Carbonate | .07 |
| Anatase Titanium Dioxide | 6.92 |
| Aluminum Silicate (Calcined Clay) | 15.57 |
| Magnesium Silicate | 15.57 |
| Calcium Sulfate | 10.38 |
| Methylene Chloride | 18.82 |
| Anti-Skinning-Agent | .14 |
| Epichlorohydrin | .21 |
| Prime Pigment Content | 6.92 |
| Solids Content | 68.93 |

This formulation exhibited a dry time of 50 seconds at 77° F (25° C) and a thickness of 0.018 mils wet.

EXAMPLE 3

A paint formulation containing the following ingredients was prepared:

| Description | Percent |
| --- | --- |
| Methylene Chloride | 9.39 |
| 60% Medium Oil Glycerine Phthalic Alkyd in Toluene | 7.48 |

-continued

| Description | Percent |
| --- | --- |
| Chlorinated Rubber (20 cps) | 9.39 |
| Chlorinated Paraffin (40%) | 7.01 |
| Montmorillonite Clay | .20 |
| Propylene Carbonate | .07 |
| Rutile Titanium Dioxide | 6.80 |
| Anatase Titanium Dioxide | 1.70 |
| Zinc Oxide | 1.70 |
| Aluminum Silicate (Calcined Clay) | 15.31 |
| Calcium Sulfate | 6.80 |
| Magnesium Silicate | 15.31 |
| Anti-Skinning-Agent | .14 |
| Epichlorohydrin | .20 |
| Methylene Chloride | 18.50 |
| Prime Pigment Content | 10.20 |
| Solids Content | 68.78 |

This formulation exhibited a dry time of 40 seconds at 77° F (25° C) and a thickness of 0.018 mils wet.

EXAMPLE 4

A paint formulation containing the following ingredients was prepared:

| Description | Percent |
| --- | --- |
| Methylene Chloride | 9.38 |
| 60% Medium Oil Glycerine Phthalic Alkyd in Toluene | 7.48 |
| Chlorinated Rubber (20 cps) | 9.38 |
| Chlorinated Paraffin (40%) | 7.00 |
| Montmorillonite Clay | .20 |
| Propylene Carbonate | .07 |
| Medium Chrome Yellow (88 to 98% PbCro$_4$) | 8.50 |
| Zinc Oxide | 1.70 |
| Molybdate Orange | .03 |
| Aluminum Silicate (Calcined Clay) | 15.30 |
| Magnesium Silicate | 15.30 |
| Calcium Sulfate | 6.80 |
| Methylene Chloride | 18.50 |
| Anti-Skinning-Agent | .14 |
| Epichlorohydrin | .21 |
| Prime Pigment Content | 10.23 |
| Solids Content | 68.78 |

This formulation exhibited a dry time of 45 seconds at 77° F (25° C) and a thickness of 0.018 mils wet.

EXAMPLE 5

A paint formulation containing the following ingredients was prepared:

| Description | Percent |
| --- | --- |
| 60% Short Oil Alkyd Resin Soya, Phthalic | 28.06 |
| Montmorillonite Clay | .32 |
| Propylene Carbonate | .09 |
| Anatase TiO$_2$ | 1.98 |
| Rutile TiO$_2$ | 7.90 |
| Aluminum Silicate (Calcined Clay) | 13.83 |
| Calcium Sulfate | 11.86 |
| Crystalline Silica | 11.86 |
| Calcium Carbonate | 9.88 |
| Normal Pentane | 8.69 |
| Methylene Chloride | 5.53 |
| Prime Pigment Content | 9.88 |
| Solids Content | 74.56 |

This formulation exhibited a dry time of 50 to 60 seconds and a thickness of 0.018 mils at 77° F (25° C).

EXAMPLE 6

A paint formulation containing the following ingredients was prepared:

| Description | Percent |
| --- | --- |
| 50% Oil Modified Polyurethane Resin in Toluene | 33.18 |
| Montmorillonite Clay | .30 |
| Propylene Carbonate | .09 |
| TiO$_2$ | 11.26 |
| Aluminum Silicate (Calcined Clay) | 11.26 |
| Calcium Carbonate | 24.40 |
| Magnesium Silicate | 7.51 |
| Anti-Skinning-Agent | .07 |
| Methylene Chloride | 15.90 |
| Prime Pigment Content | 11.26 |
| Solids Content | 74.73 |

This formulation exhibited a dry time of 60 seconds and a thickness of 0.018 mils wet at 77° F (25° C).

EXAMPLE 7

Compositions of the present invention may also include retroreflective glass beads mixed therein, generally referred to as a "pre-mix". The following is an example of such a formulation:

| Description | Percent |
| --- | --- |
| 60% Medium Oil Glycering Phthalic Alkyd in Toluene | 7.61 |
| Chlorinated Rubber (20 cps) | 9.55 |
| Chlorinated Paraffin (40%) | 7.13 |
| Montmorillonite Clay | .21 |
| Propylene Carbonate | .08 |
| Rutile Titanium Dioxide | 6.92 |
| Anatase Titanium Dioxide | 3.46 |
| Aluminum Silicate | 13.84 |
| Calcium Sulfate | 6.92 |

| Description | Percent |
| --- | --- |
| Silica Gel | 6.37 |
| Methylene Chloride | 28.37 |
| Anti-Skinning-Agent | .14 |
| Epichlorohydrin | .21 |
| Glass Spheres | 9.20 |

This formulation exhibited a dry time of 30 seconds at 77° F (25° C) and a thickness of .018 mils wet.

What is claimed is:

1. A method of applying a rapid drying marking composition comprising applying at ambient temperature a traffic paint composition onto a roadway surface, the traffic paint composition, expressed in weight percentage, containing:

| | |
| --- | --- |
| resin binder | 16–22 |
| pigment(s) | 47–48 |
| pigment volume concentration (PVC) | 46–59 |
| solvent system: | |
| boiling point 190–141° F. | 5–11 |
| boiling point 140–106° F. | 12–17 |
| boiling point 105–90° F. | 2–28 |
| boiling point greater than 225° F. | 0–12 |
| solids content | 67.5–75.5 | and allowing the thus applied paint composition to dry to a track-free state at ambient temperature in a period of 60 seconds or less.

2. The method of claim 1 wherein said resin binder is a medium oil alkyd resin, a short oil alkyd resin, an oil modified polyurethane resin or mixtures thereof.

3. The method of claim 1 wherein said resin binder consists essentially of an alkyd resin, having a polyfunctional alcohol phthalate resin content of 45–75% and an oil content of 55–25%, in combination with chlorinated rubber.

4. The method of claim 3 wherein a majority of the solvent is methylene chloride.

5. The method of claim 3 wherein the resin binder additionally contains a plasticizing amount of chlorinated paraffin.

6. The method of claim 1 wherein reflectorizing glass spheres are applied onto the applied paint composition immediately after disposition onto the roadway surface.

7. The method of claim 1 wherein the traffic paint composition also contains reflectorizing glass spheres.

8. An ambient drying traffic paint composition for application onto a roadway surface comprising, by weight:

| | |
|---|---|
| resin binder | 16–22 |
| pigment(s) | 47–48 |
| pigment volume concentration (PVC) | 46–59 |
| solvent system: | |
| boiling point 190–141° F. | 5–11 |
| boiling point 140–106° F. | 12–17 |
| boiling point 105–90° F. | 2–28 |
| boiling point greater than 225° F. | 0–12 |
| solids content | 67.5–75.5 | wherein said resin binder is (1) medium oil alkyd resin, (2) a short oil alkyd resin, (3) an oil modified polyurethane resin, or mixtures thereof, or (4) a mixture of an alkyd resin in combination with chlorinated rubber, said composition, when applied onto a roadway surface, capable of drying to a track-free state at ambient temperatures in a period of 60 seconds or less.

9. The ambient drying traffic paint composition according to claim 8 wherein the alkyd resin has a polyfunctional alcohol phthalate resin content of 45–75% and an oil content of 55–25%.

10. The ambient drying traffic paint composition according to claim 8 wherein a majority of the solvent is methylene chloride.

11. The ambient drying traffic paint composition according to claim 8 wherein the resin binder also includes a plasticizing amount of chlorinated paraffin.

12. The ambient drying traffic paint composition according to claim 11 wherein the alkyd resin is present in an amount of 5–8%, the chlorinated rubber is present in an amount of 8–10% and the chlorinated paraffin is present in an amount of 6–8% of the total formulation.

13. The ambient drying traffic paint composition according to claim 8 further including reflectorizing glass spheres.

14. An ambient drying paint composition for application onto a roadway surface comprising, by weight:
a resin binder, 16–22%, including an alkyd resin, an oil-modified polyurethane resin, or their mixture, and a chlorinated rubber, the ratio of alkyd resin to chlorinated rubber in the range of 1:3 to 3:1, together with a plasticizing amount of a chlorinated paraffin;
a solids content of 67.5 to 75.5, including said resin binder, pigments, fillers and extenders, and a liquid content making up the balance;
said liquid content including a solvent system of solvents having a:
boiling point of 190°–141° F, 5–11%
boiling point of 140°–106° F, 12–17%
boiling point of 105°–90° F, 2–28%
boiling point of greater than 225° F, 0–12%
which includes methylene chloride, the composition drying rapidly at ambient temperatures in a period of about 20–60 seconds, when applied onto a roadway surface.

15. A paint composition defined by claim 14 wherein the weight proportions of ingredients are as follows:

| | |
|---|---|
| alkyd resin binder | 5–8 |
| chlorinated rubber | 8–10 |
| chlorinated paraffin plasticizer | 6–8 |
| pigments | 47–49 |
| methylene chloride solvent | 28–31 |
| solids content | 67.5–75.5 |

16. An ambient drying paint composition comprising by weight:

| | |
|---|---|
| resin binder | 16–22 |
| pigment(s) | 47–48 |
| pigment volume concentration (PVC) | 46–59 |
| solvent system: | |
| boiling point 190–141° F. | 5–11 |
| boiling point 140–106° F. | 12–17 |
| boiling point 105–90° F. | 2–28 |
| boiling point greater than 225° F. | 0–12 |
| solids content | 67.5–75.5 | wherein said resin binder is (1) a medium oil alkyd resin, (2) a short oil alkyd resin, (3) an oil modified polyurethane resin, or mixtures of or (4) a mixture of an alkyd resin in combination with chlorinated rubber, said composition, when applied, capable of drying to a track-free state at ambient temperatures in a period of 60 seconds or less.

* * * * *